No. 11,800. Reissued Jan. 9, 1900.
J. H. WESSON.
MAGAZINE PISTOL.
(Application filed Mar. 2, 1899.)
2 Sheets—Sheet 1.
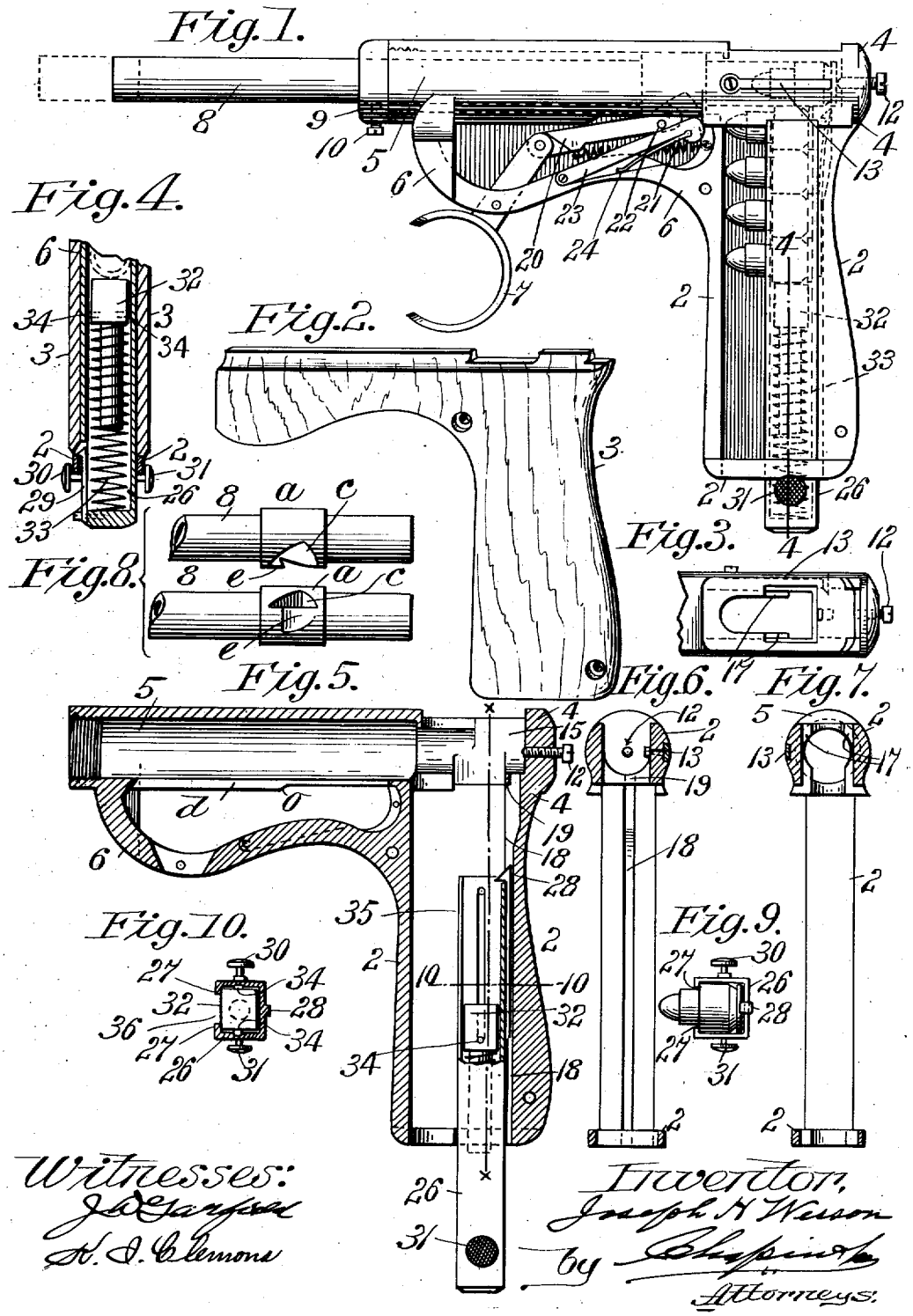
Witnesses:
J. D. Garfield
H. J. Clemons
Inventor,
Joseph H. Wesson
by Chapin & Co.
Attorneys.

No. 11,800. Reissued Jan. 9, 1900.

J. H. WESSON.

MAGAZINE PISTOL.

(Application filed Mar. 2, 1899.)

2 Sheets—Sheet 2.

Witnesses:
J. D. Guzman
H. S. Clemone

Inventor:
Joseph H. Wesson
by Chapin & Co.
Attorneys

UNITED STATES PATENT OFFICE.

JOSEPH H. WESSON, OF SPRINGFIELD, MASSACHUSETTS.

MAGAZINE-PISTOL.

SPECIFICATION forming part of Reissued Letters Patent No. 11,800, dated January 9, 1900.

Original No. 616,692, dated December 27, 1898. Application for reissue filed March 2, 1899. Serial No. 707,546.

*To all whom it may concern:*

Be it known that I, JOSEPH H. WESSON, a citizen of the United States of America, residing at Springfield, in the county of Hampden and State of Massachusetts, have invented new and useful Improvements in Magazine-Firearms, of which the following is a specification.

This invention relates to magazine-firearms, and particularly to that class thereof in which the magazine is located at the rear of the barrel and in which the latter acts as a hammer and has a sliding or longitudinally-reciprocating movement in the barrel-supporting part of the arm, induced by the movement of the trigger, the object being to provide an arm of this class of improved construction in respect to the barrel supporting and operating devices of the arm, an improved magazine and means for supporting the same relative to the barrel, and other details of improved construction, as hereinafter set forth; and the invention consists in the peculiar construction and arrangement of the operative parts of the arm, all as hereinafter fully described, and more particularly pointed out in the claims.

Figure 11:
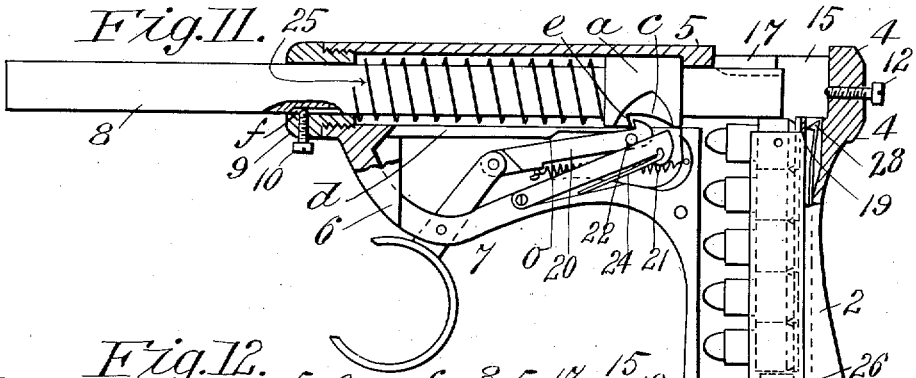
Figure 12:
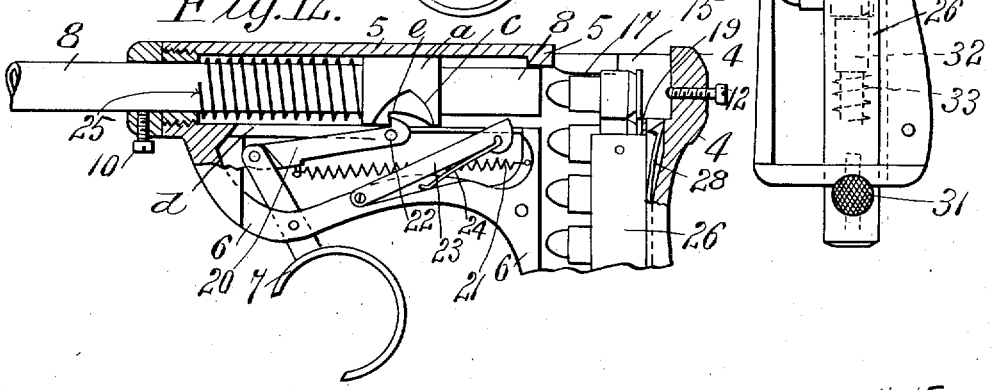
Figure 13:
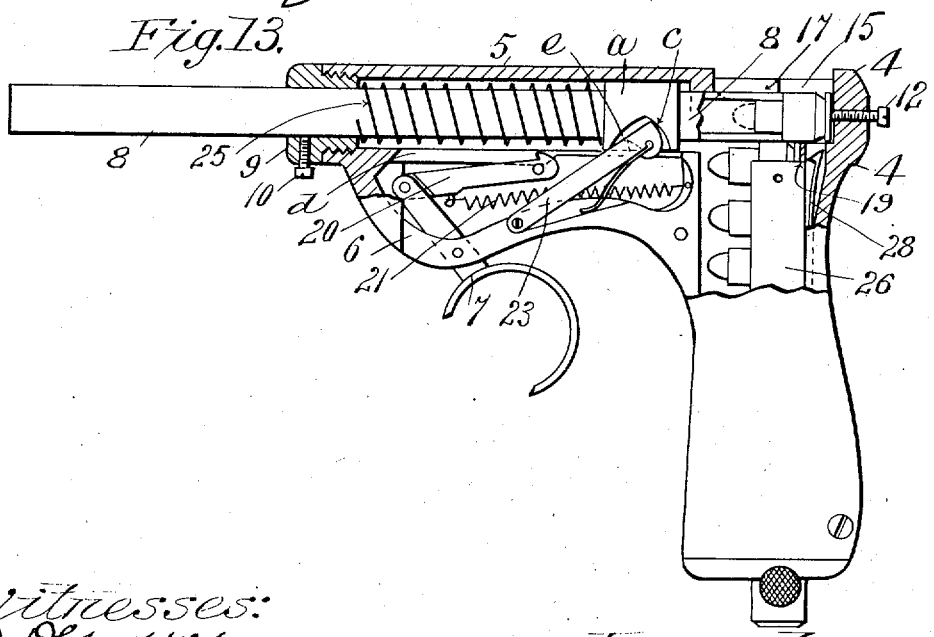

In the drawings forming part of this specification, Figure 1 is a complete side elevation with wooden side removed, the position after firing once. Fig. 2 is a side elevation of said wooden cover. Fig. 3 is a plan view looking at the lower end of the stock of the arm with magazine removed. Fig. 4 is a section on line 4 4, Fig. 1. Fig. 5 is a sectional view of the frame and the magazine partly in section. Figs. 6 and 7 are vertical sections on line $x\,x$, Fig. 5, looking back and forward, respectively. Fig. 8 is a detail view, in side elevation and bottom plan view, of the rear end of the barrel. Fig. 9 is a top plan view of the magazine, showing a cartridge therein. Fig. 10 is a section of the magazine on line 10 10, Fig. 5. Fig. 11 is a side elevation, partly in section, of the arm with magazine and cartridges therein ready for firing. Fig. 12 is a side elevation, partly in section, with barrel and operating devices, the barrel having been drawn forward, and cartridges just before the release of the barrel to let it move back for firing. Fig. 13 is a side elevation showing the trigger and parts in position at the instant of firing the arm.

Referring to the drawings, the handle of the firearm is indicated by 2, the frame portion at the upper end of the handle by 4, the tubular barrel-support by 5, and the open bracket by 6 under said support, all preferably integrally constructed and constituting, practically, the frame of the firearm; but for clearness of description said portions thereof will generally be hereinafter designated as above when separately referred to. Said tubular barrel-support 5 is shown in side elevation in Fig. 1 and in longitudinal section in Fig. 5 and in Figs. 11 to 13, inclusive, these five figures illustrating clearly the said integral construction.

The barrel 8 is of the complete form externally which is shown in Figs. 8, 11, and 12, which is as follows: It is externally of uniform diameter from the muzzle rearward nearly to its rear end, and near the latter a cylindrical enlargement $a$ is applied to or formed thereon, having the diameter of the interior of said barrel-support 5, thereby constituting the rear-end bearing of the barrel in said support. The muzzle end of the barrel is supported in line with its rear end by the bearing 9, of bushing form, which is screwed into the end of said barrel-support and has a central opening therethrough of a diameter corresponding to that of said barrel. By the above-described construction a chamber is provided in said barrel-support 5, between said enlargement $a$ on the barrel 8 and said front barrel-support 9, in which to place a coil-spring 25 around that part of the barrel therein. Said spring is normally under such degree of elongated force, acting between said support 9 and enlargement $a$, as serves to retain the barrel about in the position shown in Figs. 1 and 11 when the parts of the firearm are at rest; but when the firearm is about to be fired the said spring is compressed, as shown in Fig. 12. Any other arrangement of a barrel-actuating spring near the same and suitably connected thereto may be substituted for said coil-spring 25 if such spring shall insure the requisite cartridge-firing action of the barrel, as below set forth. A longitudinal slot $d$ is formed in the under side of said tubular barrel-support 5, as shown in the drawings, through which certain operative parts of the firearm project, as below described. A cam *o* is provided on the border of said slot *d* for a purpose below described. The said barrel enlargement *a* has formed in the under side thereof a draw-bar notch *e* and a brace-bar abutment *c*, which serve the purposes below described. Upon the outermost curved part of said open bracket 6 is pivotally hung the trigger 7, having a suitably-formed finger-piece and a lever extending from the latter toward the barrel-support and barrel, as shown. To the said trigger-lever is pivotally connected the barrel draw-bar 20, having a hook-shaped end for intermittent engagement with said notch *e* in the said barrel enlargement *a*. The barrel is prevented from moving other than endwise by a screw 10, whose point enters a groove *f* in the barrel. A trigger and draw-bar spring combined, 21, has one end connected to said bar and its opposite end secured to a fixed part of the arm, as shown. A barrel-brace 23 is pivoted by one end to said bracket, and its free end swings upward through said slot *d* in the barrel-support for engagement with said abutment *c* on the barrel enlargement *a* when the barrel is in the position shown in Figs. 1 and 5, whereby the barrel is firmly held at the moment the arm is fired. A spring 24 swings said brace upward into engagement with said abutment. A pin 22 on the side of said draw-bar 20 extends over the upper edge of said brace 23, one purpose of which is to effect the tripping or disengagement of said brace from the said barrel enlargement when the trigger swings forward to the position shown in Fig. 1 after firing, thereby leaving the barrel again free to receive another forward movement preparatory to moving backward again upon another cartridge. The second purpose of said pin 22 is to constitute means for causing the hook of said draw-bar 20 to be disengaged from the said barrel enlargement when the barrel is drawn forward for firing the arm, as shown in Fig. 12, whereby the barrel is permitted to be thrown backward to take and fire another cartridge, and said bar is disengaged, as stated, by reason of the engagement of said pin 22 in said bar 20 with said cam *o* at the border of said slot *d* at the end of the rearward trigger movement. (Illustrated in Fig. 12.) The normal position of said barrel while at rest is that shown in Fig. 11, whereby it constitutes a stop for the cartridges. It will be seen by reference to Fig. 5 and others that at the rear end of the said barrel-support directly over the interior of the handle 2 of the firearm there is a cartridge-chamber 15 open on its upper and lower sides and having a firing-pin 12 through its rear end, against the point of which a cartridge may be driven, as illustrated in Fig. 13, to cause the explosion thereof. Said chamber 15, as more clearly shown in Fig. 5, is clear to permit cartridges to pass thereinto from below to the position (of the upper one) shown in Fig. 12 to receive the rear end of the barrel thereupon, as in Fig. 13, preliminary to the firing thereof. For retaining the cartridge in said position in line with the barrel, as in said Fig. 12, until the barrel shall take it and then allow the cartridge to slide with the barrel and against said firing-pin the inwardly-projecting lips 17 on the opposite upper borders of said chamber are provided, but extending only about one-half of the length of the latter from the front end rearwardly. Thus when the cartridge has been carried backward free of said lips and fired, as aforesaid, it is free to escape upwardly out from said chamber, the front end thereof passing between said lips and its rear portion moving in the rear larger portion of said chamber. A spring-pin 13, having an inwardly-extending free end, as shown, for engagement with a groove in the cartridge-shell and to hold the latter for an instant when the barrel shall move forward after firing, is secured on the outer side of said cartridge-chamber 15. (See Figs. 1, 3, 6, and 7.)

The cartridge herein shown has a shell of peculiar construction, whereby it is especially adapted to be used in the within-described firearm. The point or ball-carrying portion of said shell is of a diameter suitable for entering the rear end of the barrel and is expansible under the force of the firing charge, as in ordinary cartridges; but the rear portion of the cartridge consists of a rigid metallic jacket or enlargement, substantially of the outside diameter of the rear end of the barrel 8, as clearly shown in Fig. 13, which incloses the rear end of the shell of which said ball-carrying portion is the front open end, said rear end carrying the usual center-fire primer. Thus it will be understood how said cartridge is adapted to act, as described herein, whereby it offers a required expansible portion to enter the barrel and form a gas-tight joint when fired and a rigid rear portion of substantially the diameter of the rear end of the barrel and adapted to engage and move rearwardly therewith when the arm is fired.

Fig. 2 illustrates the form of a stock section or side 3, of wood, hard rubber, or other suitable material, which is secured against the opposite sides of the handle and of said open bracket part 6, whereby the operative devices within the handle and frame are protected.

The magazine of the arm comprises the tubular case 26, having a lower closed end and the lips 27 on the opposite borders of a longitudinal slot 36 in one side thereof, a cartridge-plunger 32 within said case, a plunger-moving spring 33, and stop and guide pins 34 on opposite sides of the plunger-head engaging grooves 35 in the inner opposite walls of said case. A spring-hook 28, applied to the rear wall of the case, enters and moves in a slot 18 in the inner rear wall of the handle 2, the hook proper of this spring projecting inwardly at the open end of the magazine-case, as shown in Figs. 5 and 9, and, as shown in this last-named figure, engaging the rear end of the top cartridge in the case, whereby a group of the latter is temporarily retained therein after loading the magazine, which loading is effected (when out of the arm) by pushing the cartridges one by one into said case past said spring-hook 28, the latter engaging each one, as shown, as it passes by the hook. At or about at the junction of said slot in the rear wall of the handle 2 with the rear end of said cartridge-chamber 15 (see Figs. 5 and 6 and others) is a bridge 19, back of which is a recess, into which the upper extremity of said spring-hook 28 is forced when the magazine is placed in said handle, as shown in Fig. 1, thereby springing backwardly the hook on said spring, as shown in Figs. 12 and 13, and disengaging the same from the upper cartridge, thereby permitting the latter and all below it to be moved upward by said magazine spring and plunger, and such action carries the cartridges one after another successively to the position behind the barrel 8 (shown in Fig. 12) ready for firing; but the cartridges are first arrested by the barrel while in its said normal position, as in Fig. 11. By drawing the barrel forward slightly, as in Fig. 12, the upper cartridge in the magazine is permitted to take the position shown in the last-named figure. Said magazine-case 26 (see Fig. 4) is provided with a hook-carrying spring 29, having a press-button 30 thereon, the hooked end of which spring engages with a part of the lower end of said handle 2, as illustrated in said last-named figure, thereby retaining the magazine in the position in the firearm shown in Fig. 1 and until said button 30 is pressed upon to move said spring 29 inwardly. A button 31 is placed on said magazine opposite said button 30 to provide a counter-rest for the fingers while operating said spring 29.

The operation of the within-described firearm in firing the same after inserting the charged magazine into the handle thereof, as described, is as follows, the barrel and the devices actuating the latter all occupying, when said magazine is inserted, the positions shown in Figs. 1 and 11: The handle 2 being grasped, the trigger is pulled backwardly, as in Fig. 12, thus letting the cartridges rise in the magazine, the upper one of the group being arrested by the lips 17 in the position shown in said last-named figure behind and in line with the bore of the barrel. The continued movement of the trigger backwardly serves to carry the draw-bar 20 so far forward that the trip-pins thereon are brought against the cam *o* on the under side of the barrel-support 5, thereby disengaging said bar from the barrel and permitting the latter to be driven by the spring 25 backward, taking the top cartridge of the group with it and carrying the head thereof forcibly against the firing-pin 12, thereby causing the explosion of the cartridge and effecting said firing. The arm parts at the instant of said firing occupy the positions shown in Fig. 13, wherein it is seen that the barrel-brace 23 rigidly holds the barrel in engagement with the cartridge when the firing takes place. The trigger is now in the forward position shown in Fig. 11, again engaging the draw-bar 20 with the barrel, as in Fig. 11, and the firing is repeated as frequently as the trigger may be so operated. At each forward movement of the barrel after firing, the empty cartridge-shell (see Fig. 13) being now engaged by its head by said spring-pin 13, whereby it is held while the barrel is moved forward, is at the instant that the barrel is clear from it quickly thrown upward out of said chamber 15 by the action of said magazine spring and plunger upon the cartridges beneath the upper one, and the following uppermost cartridge of the group then takes the position in the chamber 15 (shown in Fig. 12) ready to receive the barrel, as did the first one of the cartridge group.

The cartridge-shell construction herein dedescribed and shown does not *per se* constitute the subject-matter of this invention; but the same is reserved for another application which is filed simultaneously with this.

Having thus described my invention, what I claim, and desire to secure by Letters Patent, is—

1. In a firearm, a frame, a barrel supported for longitudinal reciprocating movement in said frame, a spring acting to move said barrel in one direction, a trigger, means controlled by said trigger for moving said barrel in an opposite direction, and means for automatically locking said barrel in a firing position, combined and operating substantially as set forth.

2. In a firearm, a frame, a barrel supported for longitudinal reciprocating movement in said frame, a spring acting to move said barrel in one direction, a trigger, means controlled by said trigger for moving said barrel in an opposite direction, means for automatically locking said barrel in a firing position, and means controlled by said trigger whereby said barrel-locking devices are disengaged therefrom, combined and operating substantially as set forth.

3. In a firearm, a frame, a barrel supported for longitudinal reciprocating movement in said frame, a spring actuating said barrel for a rearward movement, a trigger, a trigger-spring, a barrel draw-bar connected to said trigger having an intermittent engagement with said barrel whereby the latter is moved forwardly against said spring, means for automatically locking the barrel at the termination of said rearward movement, and mechanism actuated by the spring-induced trigger-swinging movement for disengaging the said barrel-locking devices therefrom, combined and operating substantially as set forth.

4. In a firearm, a frame, a barrel supported for longitudinal reciprocating movement in said frame, a spring actuating said barrel for a rearward movement, a trigger, a trigger-spring, a barrel draw-bar connected to said trigger for engagement with said barrel, means for automatically disengaging said draw-bar from the barrel at the termination of the forward movement thereof, means for automatically locking the barrel at the termination of said rearward movement, and mechanism actuated by the spring-induced trigger-swinging movement for disengaging said barrel-locking devices therefrom, combined and operating substantially as set forth.

5. In a firearm of the class described, a frame having a tubular barrel-support thereon, a barrel for sliding movements in said support, and a spring forcing said barrel rearwardly, combined with a trigger 7, a barrel draw-bar 20 pivotally connected to said trigger and having an intermittent engagement with said barrel whereby a forward movement is imparted thereto against the action of said spring, a trigger-spring 21, and a barrel-brace 23, holding said barrel in a firing position, and means actuated by the swinging movement of the trigger for disconnecting said brace from the barrel, substantially as set forth.

6. The magazine-case 26, having a longitudinal slot in one side and cartridge-engaging borders 27, on opposite edges thereof, a spring-actuated plunger 32, within said case, a spring-hook 28 retaining cartridges in the case until the latter is placed in the arm, stop-pins 34 on said plunger controlling its outward movement, and a spring-hook 29, retaining said case in the arm, combined with the bridge 19, in the frame of the arm to which the magazine is applied with which the free end of said hook 28 engages, whereby the cartridges are disengaged therefrom, substantially as set forth.

7. In a magazine-firearm, a magazine therefor having a spring thereon for engaging the upper cartridge therein when charged, combined with the spring-releasing part 19, within the arm, against which said spring is moved when the loaded magazine is placed therein, and a spring-hook on said magazine acting to retain the same in the arm, substantially as described.

8. In a magazine-firearm of the class described, a frame, a longitudinally-movable barrel supported therein, a cartridge-magazine in the handle of the arm, a cartridge-chamber located over said magazine, an opening through the top wall of said chamber, a portion of which lying over the magazine is narrower than a portion of the cartridge-shell, and the opposite end of said opening having a diameter somewhat greater than that of the widest part of said shell, and means for moving said cartridge vertically in said magazine into said chamber, and longitudinally in the latter to firing and ejecting position under said wider portion of said opening, substantially as described.

9. In a magazine-firearm of the class described comprising a hollow handle and a longitudinal sliding barrel supported in the frame of the arm; a magazine in said handle in which the cartridges are vertically movable; a cartridge-chamber at the top of said magazine communicating therewith and extending rearwardly beyond the line of vertical movement of the cartridges, and a firing-pin in the rear wall of said chamber; an opening through the top wall of said chamber having a transverse diameter at the forward end thereof less than the greatest diameter of the cartridge-shell, and a diameter at the rear end thereof greater than the greatest diameter of the shell, whereby ejection of a cartridge-shell is impossible until it has been moved rearwardly of the position it occupied in the magazine, substantially as described.

JOSEPH H. WESSON.

Witnesses:
WM. H. CHAPIN,
K. I. CLEMONS.